(12) United States Patent
Balamane et al.

(10) Patent No.: US 9,042,209 B2
(45) Date of Patent: May 26, 2015

(54) E-ANTENNA NEAR FIELD TRANSDUCER WITH THERMAL SHUNT TO RETURN POLE

(71) Applicant: HGST Netherlands B.V., Amsterdam (NL)

(72) Inventors: Hamid Balamane, Portola Valley, CA (US); Erhard Schreck, San Jose, CA (US); Matteo Staffaroni, Pleasanton, CA (US); Barry Cushing Stipe, San Jose, CA (US)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 13/954,754

(22) Filed: Jul. 30, 2013

(65) Prior Publication Data

US 2015/0036470 A1 Feb. 5, 2015

(51) Int. Cl.
G11B 11/00 (2006.01)
G11B 13/08 (2006.01)

(52) U.S. Cl.
CPC ...................... G11B 13/08 (2013.01)

(58) Field of Classification Search
CPC ............... G11B 2005/0021; G11B 2005/0032
USPC .................. 369/13.33, 13.13, 13.24
See application file for complete search history.

(56) References Cited

U.S. PATENT DOCUMENTS

| | | | |
|---|---|---|---|
| 8,259,540 B1 | 9/2012 | Sahoo et al. | |
| 8,320,220 B1 * | 11/2012 | Yuan et al. | 369/13.33 |
| 8,339,739 B2 | 12/2012 | Balamane et al. | |
| 8,366,948 B2 | 2/2013 | Sasaki et al. | |
| 8,391,108 B2 | 3/2013 | Peng et al. | |
| 8,416,647 B1 | 4/2013 | Zhao et al. | |
| 8,514,672 B2 * | 8/2013 | Grobis et al. | 369/13.33 |
| 8,842,383 B1 * | 9/2014 | Balamane et al. | 369/13.33 |
| 2010/0123965 A1 * | 5/2010 | Lee et al. | 369/13.33 |
| 2012/0051196 A1 * | 3/2012 | Grobis et al. | 369/13.24 |
| 2012/0113770 A1 * | 5/2012 | Stipe | 369/13.33 |
| 2012/0163139 A1 | 6/2012 | Vavra et al. | |
| 2013/0064051 A1 * | 3/2013 | Peng et al. | 369/13.33 |
| 2013/0070576 A1 | 3/2013 | Zou et al. | |
| 2013/0258825 A1 * | 10/2013 | Seigler et al. | 369/13.33 |
| 2014/0016448 A1 * | 1/2014 | Challener et al. | 369/13.33 |

* cited by examiner

Primary Examiner — Tan X Dinh
(74) Attorney, Agent, or Firm — John D. Henkhaus

(57) ABSTRACT

In a heat-assisted magnetic recording head for use in a hard disk drive, a thermal shunt is positioned between an E-antenna near field transducer (NFT) and a return pole, to draw excess heat away from the NFT region. The thermal shunt comprises two portions separated by a gap that has a trapezoidal cross-section, where the NFT-side of the gap is wider than the return pole-side of the gap.

18 Claims, 4 Drawing Sheets

VIEW A-A

VIEW A-A

E-ANTENNA NEAR FIELD TRANSDUCER WITH THERMAL SHUNT TO RETURN POLE

FIELD OF EMBODIMENTS OF THE INVENTION

Embodiments of the invention relate generally to hard disk drives and more particularly to thermal management in a heat-assisted magnetic recording head.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk.

Increasing areal density (a measure of the quantity of information bits that can be stored on a given area of disk surface) is one of the ever-present holy grails of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) [which may also be referred to as energy-assisted magnetic recording (EAMR) or thermal-assisted magnetic recording (TAR)] is a known technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature above the Curie temperature, at which the medium effectively loses coercivity and a realistically achievable magnetic write field can write data to the medium.

One approach to HAMR designs is to utilize a semiconductor laser system to heat the media to lower its coercivity, whereby the optical energy is transported from the laser to the slider ABS via a waveguide and is concentrated to a nanometer-sized spot utilizing a near field transducer (NFT). However, some of the optical energy provided to the NFT is absorbed by the materials in and surrounding the NFT. Consequently, heat-induced degradation of the NFT as well as the write pole lip may occur and, ultimately, possible head failure.

More detailed information about the structure and functionality of a thermally assisted magnetic write head employing an NFT can be found in U.S. Pat. No. 8,351,151 to Katine et al., which is incorporated by reference in its entirety for all purposes as if fully set forth herein.

SUMMARY OF EMBODIMENTS OF THE INVENTION

Embodiments of the invention are directed towards a near field transducer with a thermal shunt, in a heat-assisted magnetic recording head for use in a hard disk drive.

According to an embodiment, a thermal shunt is positioned between an E-antenna near field transducer (NFT) and a return pole, to draw excess heat away from the NFT and to provide surface area for convection of heat away from the head slider surface. According to an embodiment, the thermal shunt comprises two portions separated by, for example, alumina. According to an embodiment, the gap between the two portions of the thermal shunt has a trapezoidal cross-section, where the NFT-side of the gap is wider than the return pole-side of the gap.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 4 is a bottom view illustrating the NFT-to-shunt interface, according to an embodiment of the invention; and.

DETAILED DESCRIPTION

Approaches for a heat-assisted magnetic recording head having a near field transducer with a thermal shunt, for use in a hard disk drive for example, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
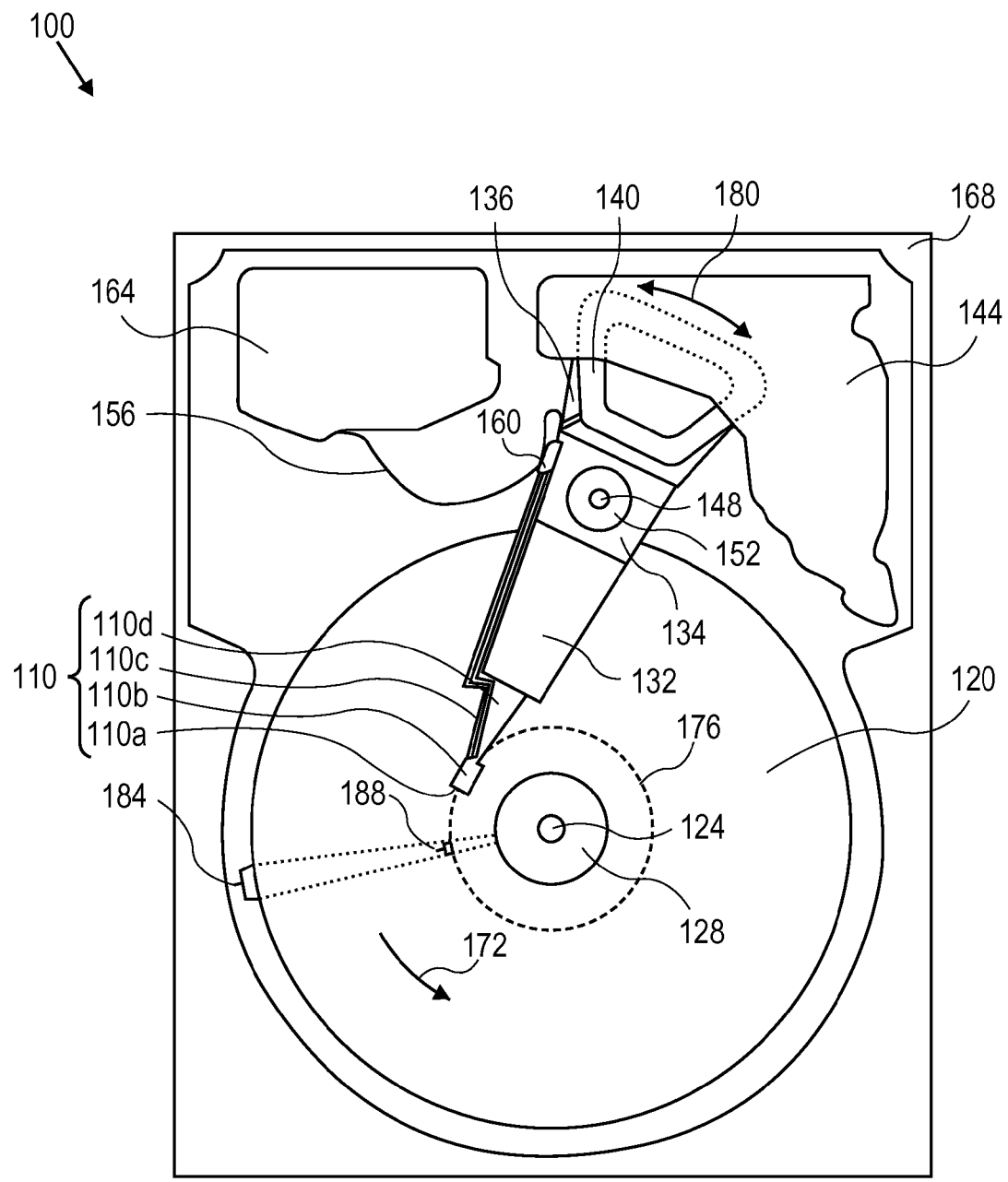
FIG. 1 is a plan view illustrating an HDD, according to an embodiment of the invention.

Embodiments of the invention may be used in the context of a magnetic writer for a hard-disk drive (HDD). In accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not shown) attached to the spindle 124 for rotating the media 120. The head 110a includes a write element and a read element for respectively writing and reading information stored on the media 120 of the HDD 100. The media 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks (not shown) arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Heat-Assisted Magnetic Recording Head

Figure 2:
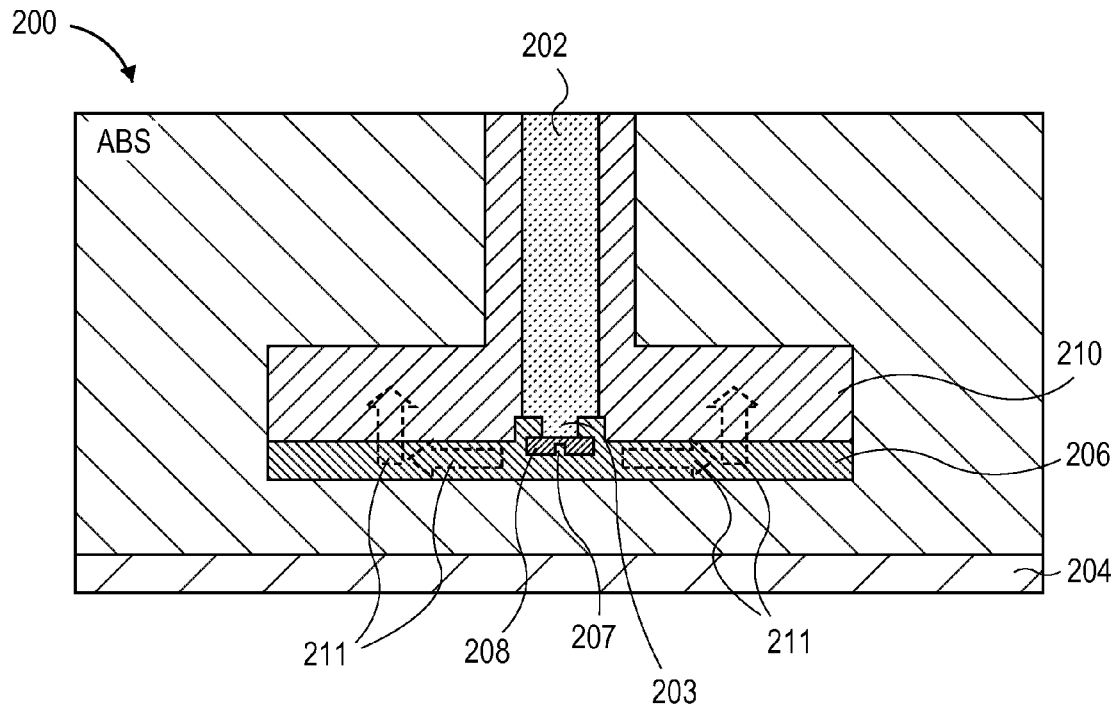
FIG. 2 is an air bearing surface view illustrating a conventional near field transducer configuration for a heat-assisted magnetic recording head.

FIG. 2 is an air bearing surface (ABS) view illustrating a conventional near field transducer configuration for a heat-assisted magnetic recording head, according to an embodiment of the invention. With reference to FIG. 2, a heat-assisted magnetic recording (HAMR) head 200 is described, which may be incorporated into a head such as head 110a (FIG. 1). The HAMR head comprises a write pole 202 and a magnetic return pole that both extend to the ABS. The write pole 202 may comprise a write pole lip 203, and the return pole may comprise a return pole pedestal 204, both also at the ABS. As depicted, the return pole pedestal 204 has a cross section at the ABS that is larger than the cross section of the write pole 202 at the ABS. The write pole 202 can be connected with a shaping layer in a region removed from the ABS. A magnetic back gap layer connects the shaping layer with the return pole in a region removed from the ABS, thereby magnetically connecting the write pole 202 with the return pole and shaping layer in a region removed from the ABS. The write pole 202, the return pole pedestal 204, shaping layer and back gap are all constructed of a magnetic material, such as CoNiFe, NiFe or CoFe.

In view of the head being a HAMR head, the HAMR head 200 comprises a heating assembly that can be provided adjacent to the write pole 202 for locally heating the magnetic media 120 (FIG. 1). For example, a plasmonic heating device may be implemented for the heating assembly. Thus, according to an embodiment, the heating assembly comprises an optical energy source, such as a semiconductor laser mounted on or near the backside (opposite the ABS) of the head slider. The heating assembly further comprises a near-field transducer (NFT) 206 for concentrating the optical energy to a nanometer-sized spot to locally heat the magnetic media 120 in a region just upstream from the write pole 202. Further, the heating assembly comprises a waveguide to guide, transmit or carry the optical energy to the ABS, to illuminate the NFT 206.

This localized heating of the magnetic media 120 (FIG. 1) momentarily reduces the local coercivity of the magnetic media 120, which greatly facilitates writing to a magnetic media 120 which has an otherwise too high coercivity to be written to. In order for the heating assembly to function effectively, it should be located as close as possible to the write pole 202. In addition, the heating assembly should heat only a very small area on the media in order to avoid demagnetizing adjacent tracks of data or downstream data on the same track.

According to an embodiment, the NFT 206 comprises an E-antenna (or c-aperture). The dielectric aperture in such a structure looks like the letter "c", while the metal surrounding that dielectric forms an antenna in the shape of a capital letter "E". As such, the HAMR head 200 comprises an aperture 208 and the E-antenna NFT 206 comprises a tip 207, whose dimensions in part determine the near-field spot size, i.e., the size of the localized heating of the magnetic media 120 (FIG. 1). The electrical interaction of the write pole 202 and the NFT 206 form what is referred to as an LC resonator (or "LC circuit"), whereby an electrical field oscillates between the write pole lip 203 and the NFT tip 207, thereby interacting optically with and generating heat in the magnetic media 120 by generating AC currents (at optical frequencies) within the magnetic media 120, which in turn are responsible for heat generation in the media itself through Joule heating. In operation, the E-antenna NFT 206 generates heat not only at the media but also at the NFT 206. Therefore, it is typical to provide a heat sink structure, such as a heat sink 210 and the lateral "wings" of NFT 206 outside the write pole lip 203-NFT tip 207-aperture 208 area, to direct some of the heat away from the write pole lip 203 and NFT tip 207 (such as depicted by block arrows 211), for convection away from the slider at the ABS. However, note that in a conventional E-antenna NFT configuration, such as illustrated in FIG. 2, a large gap (~400 nm) separates the bottom of the NFT and the return pole pedestal.

Certain approaches to fabricating a c-aperture or E-antenna plasmonic NFT are described in U.S. Pat. No. 8,092,704 to Balamane et al., the subject matter of which is incorporated by reference for all purposes as if fully set forth herein.

Heat-Assisted Magnetic Recording Head with Thermal Shunt to Return Pole

A portion of the optical power not converted into the focused optical power generates heat at the NFT 206 and the surrounding region. Thus, the aforementioned concentration of light energy leads to heating of the E-antenna NFT 206, and the write pole lip 203, for example. The excess heat at the NFT 206 causes it to degrade over time, for example, the gold with which the E-antenna is typically fabricated may buckle.

Figure 3:
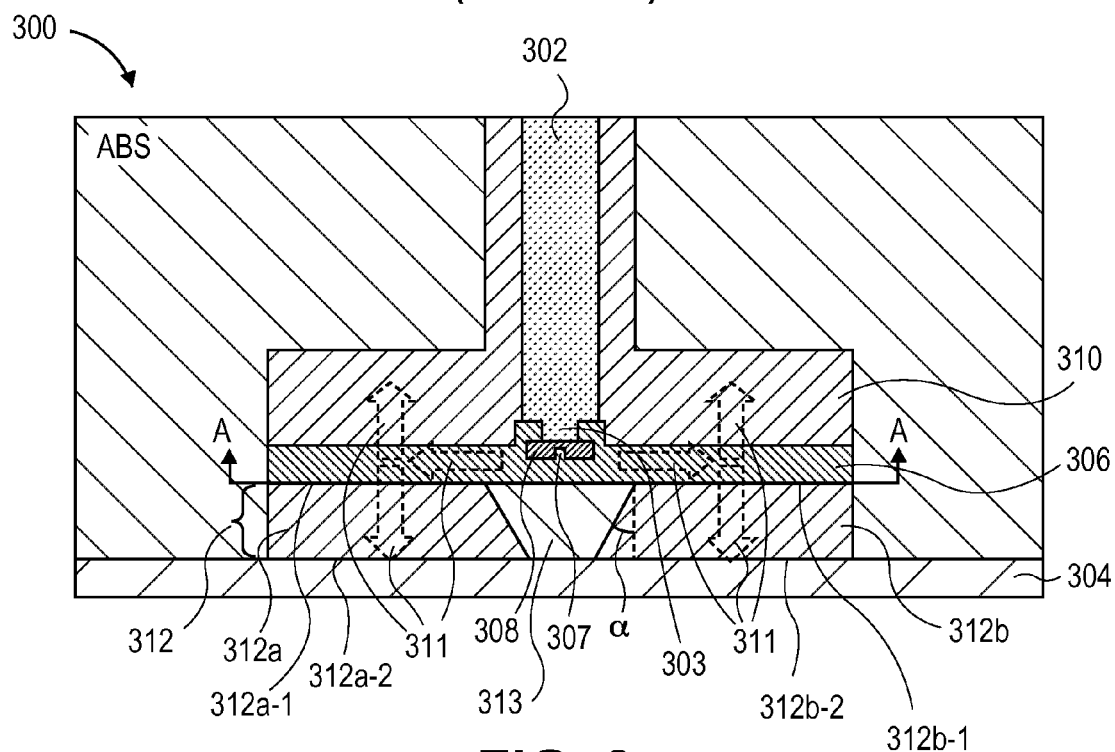
FIG. 3 is an air bearing surface view illustrating a near field transducer configuration with a thermal shunt, according to an embodiment of the invention.

FIG. 3 is an air bearing surface view illustrating a near field transducer configuration with a thermal shunt, according to an embodiment of the invention. Similar to the HAMR head 200 illustrated in and described in reference to FIG. 2, the HAMR head 300 of FIG. 3 comprises a write pole 302 and a magnetic return pole that both extend to the ABS. The write pole 302 may comprise a write pole lip 303, and the return pole may comprise a return pole pedestal 304, both also at the ABS. The write pole 302 can be connected with a shaping layer in a region removed from the ABS. A magnetic back gap layer connects the shaping layer with the return pole in a region removed from the ABS, thereby magnetically connecting the write pole 302 with the return pole and shaping layer in a region removed from the ABS. The write pole 302, the return pole pedestal 304, shaping layer and back gap are all constructed of a magnetic material, such as CoNiFe, NiFe or CoFe.

In view of the head being a HAMR head, the HAMR head 300 comprises a heating assembly that can be provided adjacent to the write pole 302 for locally heating the magnetic media 120 (FIG. 1). For example, a plasmonic heating device may be implemented for the heating assembly. Thus, according to an embodiment, the heating assembly comprises an optical energy source, such as a semiconductor laser (e.g., a laser diode) mounted on or near the backside (opposite the ABS) of the head slider. The heating assembly further comprises a near-field transducer (NFT) 306 for concentrating the optical energy to a nanometer-sized spot to locally heat the magnetic media 120 in a region just upstream from the write pole 302. Further, the heating assembly comprises a waveguide to guide, transmit or carry the optical energy to the ABS, to illuminate the NFT 306.

According to an embodiment, the NFT 306 comprises an E-antenna (or c-aperture), similar to or the same as described with reference to FIG. 2. As such, the HAMR head 300 comprises an aperture 308 and the E-antenna NFT 306 comprises a tip 307, whose dimensions in part determine the near-field spot size, i.e., the size of the localized heating of the magnetic media 120 (FIG. 1). The electrical interaction of the write pole 302 and the NFT 306 form what is referred to as an LC resonator (or "LC circuit"), whereby an electrical field oscillates between the write pole lip 303 and the NFT tip 307, thereby interacting optically with and generating heat in the magnetic media 120 by generating AC currents (at optical frequencies) within the magnetic media 120, which in turn are responsible for heat generation in the media itself through Joule heating.

According to an embodiment, the mode associated with the polarization of the illumination, i.e., the electromagnetic radiation, used to heat the magnetic media 120 is a transverse magnetic (TM) mode, in which there is no magnetic field in the direction of propagation of the electromagnetic radiation. This TM mode is in contrast with a transverse electric (TE) mode, in which there is no electric field in the direction of propagation of the electromagnetic radiation. The mode in which the system operates is related to the position at which the energy source is coupled to the head slider, and affects the manner in which the NFT operates. As discussed, the E-antenna NFT 306 operates in a TM mode, where the electrical field resonates between the write pole lip 303 and the NFT tip 307.

In operation, the E-antenna NFT 206 generates heat not only at the media but also at the NFT 206. Therefore, it is beneficial to provide one or more heat sink structures, such as a heat sink 310 as well as the lateral "wings" of NFT 306 outside the immediate write pole lip 303-NFT tip 307-aperture 308 region, to direct some of the heat away from this region. Airflow and convection at the ABS is the primary mechanism for dissipating heat from the slider, generally, and the NFT 306 area in particular.

An E-antenna type of NFT is unique among other types of NFT's for HAMR in that the E-antenna NFT can tolerate the presence of metal heat sinks in the vicinity of the field enhancement region without this resulting in adverse effects on optical performance. Therefore, HAMR head 300 further comprises a thermal shunt 312 positioned between the NFT 306 and the return pole pedestal 304, according to an embodiment. Thermal shunt 312 acts to direct more of the excess heat away from the write pole lip 303 and NFT tip 307 (such as depicted by block arrows 311) in part by diffusing the heat across more surface area of the ABS so that more convection may occur. Thermal shunt 312 of HAMR head 300 effectively provides an additional path for heat to escape from the NFT 306 area, in comparison with the HAMR head 200. With thermal shunt 312 the excess heat is now also directed toward the return pole pedestal 304, for convection away from the slider. Introducing a thermal shunt heat sink between the NFT 306 and the return pole pedestal 304 is an effective way to reduce the NFT tip 307 and write pole lip 303 temperature of a given E-antenna structure with a fixed magnetic lip width and a fixed lip-to-tip spacing.

According to an embodiment, thermal shunt 312 is a multi-piece structure, for example, having two portions which are separated from each other in a lateral (cross-track) direction. Therefore, according to an embodiment, thermal shunt 312 comprises a first portion 312a and a second portion 312b, which are separated by a gap 313. The gap 313 may be filled with a dielectric, such as alumina ($Al_2O_3$) or silica ($SiO_2$) or some other dielectric with relatively similar optical properties. For heat diffusion purposes alone, a single-piece, continuous heat sink may be more beneficial than a multi-piece thermal shunt such as thermal shunt 312. However, a single-piece thermal shunt would break the resonance of the LC resonator embodied by the electrical interaction of the write pole 302 and the NFT 306, by altering the values of the capacitor (C) and/or the inductor (L) elements, as the thickness (height) of the metal of NFT 306 beneath the aperture 308 has a significant effect on the resonance of the LC resonator functionality. If thermal shunt 312 were a continuous piece of metal between the NFT 306 and the return pole pedestal 304, then the electrical field between the write pole lip 303 and NFT tip 307 would be weakened which would in turn diminish the amount of heat that can be generated by the structures. Furthermore, if one were to mirror the E-antenna (with or without a tip) below NFT 306, thereby forming what is referred to as an H-antenna, two separate hot spots would be generated. This is an undesirable scenario as the additional hot spot would likely erase adjacent tracks on the magnetic media when the H-antenna is operating.

Research has shown that use of an optimized thermal shunt between the NFT and the return pole pedestal, such as thermal shunt 312 between NFT 306 and pedestal 304 as described herein, can reduce the peak NFT temperature rise by up to approximately 24%.

Thermal Shunt Configuration Considerations

The precise dimensions associated with portions 312a, 312b of thermal shunt 312 may vary from implementation to implementation based on, for example, the corresponding configurations of the NFT and other HAMR head structures. Some general guidance in this regard is as follows.

With further reference to FIG. 3, the gap 313 between the first portion 312a and the second portion 312b of thermal shunt 312 is depicted as having a trapezoidal shape, where the distance between the upper surfaces (the NFT-sides 312a-1 and 312b-1) of portions 312a, 312b is greater than the distance between the lower surfaces (the return-pole sides 312a-2 and 312b-2) of portions 312a, 312b. Such a trapezoidal shape is effective and is preferable based on several considerations. Regarding the distance between the NFT-sides of portions 312a, 312b, this distance should be sufficiently wide enough so that it does not alter the LC values, sufficiently narrow enough so that it effectuates the dissipation of the heat from the NFT structures effectively, and that it accounts for manufacturing and alignment tolerances.

As discussed, a single-piece thermal shunt would break the resonance of the LC resonator embodied by the electrical interaction of the write pole 302 and the NFT 306. Similarly, a two-piece thermal shunt having NFT-sides that are too close together would also affect the electrical field of the LC resonator and the corresponding heat generated therefrom. Regarding the distance between the return pole-sides of portions 312a, 312b, this distance should be sufficiently wide enough so that it does not create an undesirably large hot spot, or additional hot spots at the interface between the return pole-sides and the return pole pedestal 304. The closer together are the return pole-sides of portions 312a and 312b the more likely that a secondary strong optical field may develop near where the return pole-sides are converging and consequently the more likely that this secondary strong optical field would interact with the media to generate a secondary hot spot in the media through Joule heating, such as would likely occur if the return pole-sides of portions 312a and 312b are in contact with each other. Thus, modeling has shown that a preferred, but not limiting, angle of incline (a) between the NFT-side and the corresponding return pole-side for each of portions 312a and 312b should not exceed approximately 30 degrees from the vertical, to avoid creation of secondary hot spots.

Figure 4:
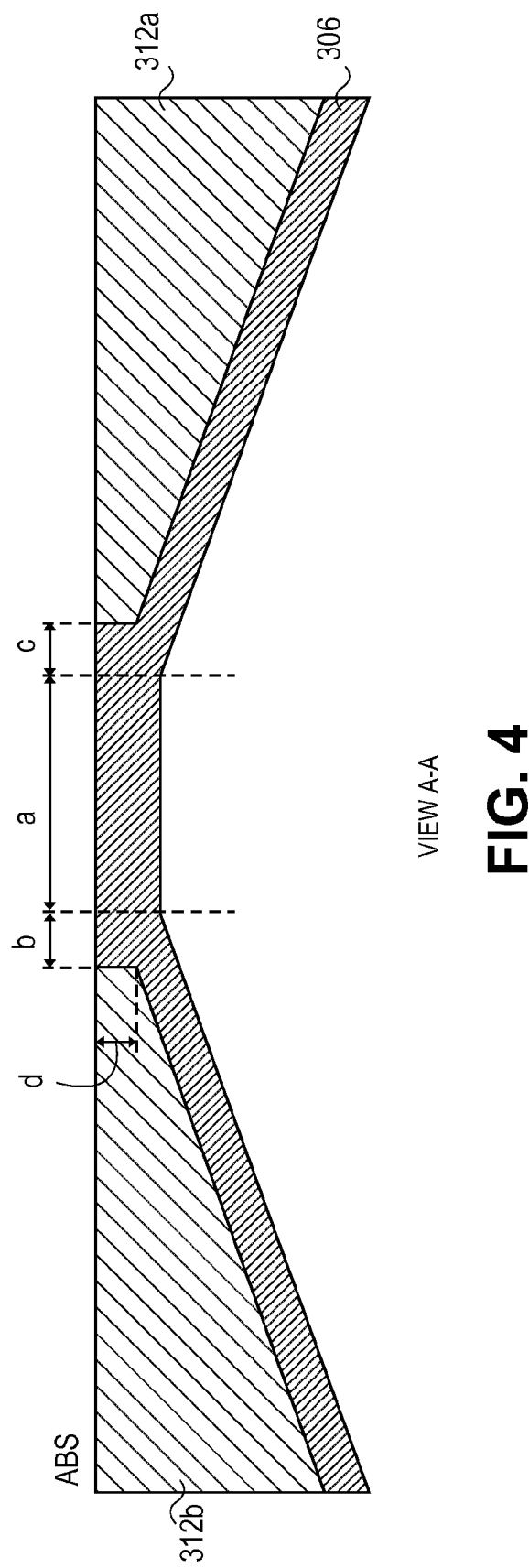

The thermal shunt 312 is a three-dimensional structure that follows the cross-track and throat profile of the NFT 306, according to an embodiment. FIG. 4 is a bottom view illustrating the NFT-to-shunt interface, slicing through HAMR head 300 at interface line A-A of FIG. 3, according to an embodiment of the invention. FIG. 4 illustrates the top of the first portion 312a and the second portion 312b of thermal shunt 312, which is positioned below NFT 306, a bottom portion of which is viewable extending outside of the boundaries of the first and second portions 312a, 312b. In this bottom view, the ABS is toward the top of the drawing of FIG. 4.

Dimension a represents the operational width of NFT 306, i.e., an optimized width necessary for its proper operational functionality. Dimension b and dimension c represent optimized dimensions determined to account for nominal lateral (left-right, in this illustration) fabrication misalignment of the thermal shunt portions 312a, 312b relative to the NFT 306, such that the thermal shunt 312 does not interfere with the optical operation of NFT 306. Typically, dimension b and dimension c would be equal due to equivalent nominal fabrication tolerances present on each side of the operational width of NFT 306. Similarly, dimension d represents an optimized dimension determined to account for nominal longitudinal (up-down, in this illustration) fabrication misalignment of the thermal shunt portions 312a, 312b relative to the NFT 306, such that the thermal shunt 312 does not interfere with the optical operation of NFT 306.

Figure 5:
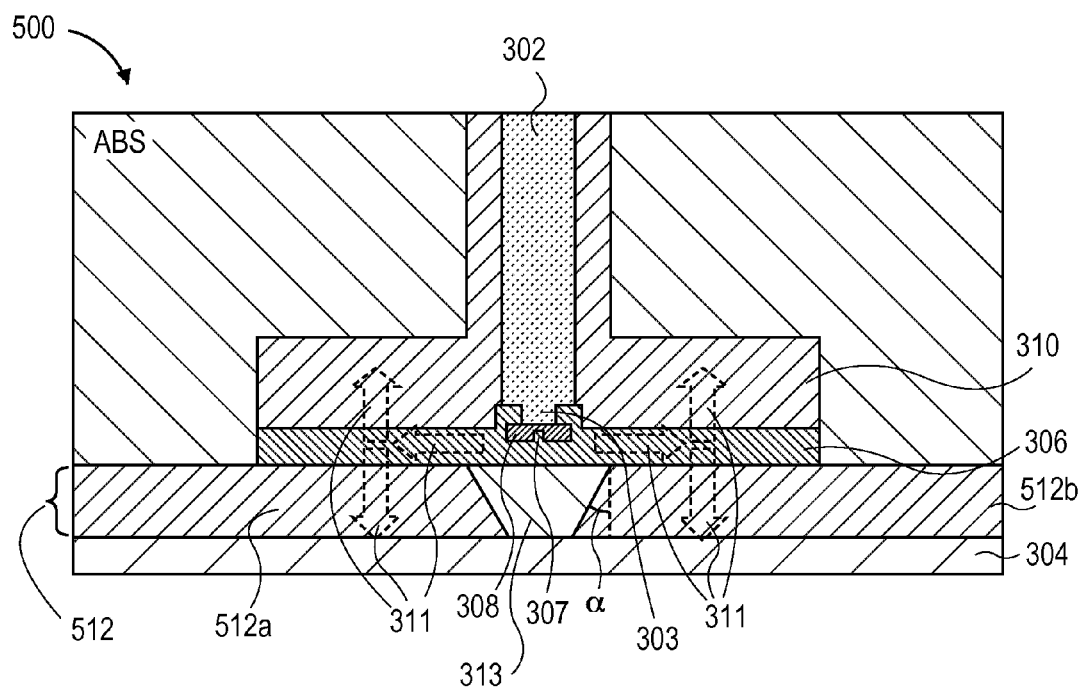
FIG. 5 is an air bearing surface view illustrating a near field transducer configuration with a thermal shunt, according to an embodiment of the invention.

According to an embodiment and as depicted in FIG. 4, thermal shunt 306 is configured as wide as the NFT 306, which includes the operational width and its lateral "wing" heat sink structures. As such, the presence of the thermal shunt 312 does not significantly alter the power radiated by the waveguide at the dielectric aperture 308 (FIG. 3) at the NFT 306 to the far-field. This far-field power signal can be used for alignment of the semiconductor laser to the slider during manufacturing. Further, according to an alternative embodiment, the thermal shunt 512 (having first portion 512a and second portion 512b) cross-track dimension (width) is extended to the full width of the return pole pedestal 304, to block any stray light that was not properly coupled form the laser to the dielectric waveguide, as illustrated in HAMR head 500 of FIG. 5, and where reference is made to like reference numerals in FIG. 3 for corresponding descriptions of like components. This stray light is undesirable because it pollutes the aforementioned far-field power signal that can be relied on to accurately perform the laser-to-slider alignment process.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A heat-assisted magnetic recording (HAMR) head slider comprising:
   a magnetic write pole extending to an air bearing surface;
   a magnetic return pole, magnetically connected with said write pole in a region removed from said air bearing surface;
   an E-antenna near field transducer (NFT) configured to receive optical energy and to emit at least a portion of said optical energy to a magnetic-recording medium, said NFT comprising an E-antenna having a tip, an aperture, and a magnetic write pole lip; and
   a thermal shunt positioned between said NFT and said return pole and configured to draw heat from said NFT, said thermal shunt comprising a first portion and a second portion separated from said first portion such that the electrical field between said write pole lip and said tip is stronger than would otherwise be if said thermal shunt comprised a single continuous piece.

2. The HAMR head slider of claim 1, wherein said first portion comprises an NFT-side and a return pole-side and said second portion comprises an NFT-side and a return pole-side, and wherein the distance between said NFT-sides is greater than the distance between said return-pole sides.

3. The HAMR head slider of claim 1, wherein said thermal shunt comprises a first portion and a second portion separated from said first portion by a trapezoidal cross-section shaped gap.

4. The HAMR head slider of claim 1, wherein said thermal shunt comprises a first portion and a second portion separated from said first portion by a dielectric gap.

5. The HAMR head slider of claim 1, wherein said write pole lip and said E-antenna form an LC resonator.

6. The HAMR head slider of claim 1, wherein said optical energy received at said E-antenna NFT has a transverse magnetic mode of electromagnetic radiation.

7. The HAMR head slider of claim 1, wherein said E-antenna NFT has a particular lateral width at said air bearing surface, and wherein said thermal shunt has a lateral width approximate to said particular lateral width of said E-antenna NFT.

8. The HAMR head slider of claim 1, wherein said return pole comprises a pedestal having a particular lateral width at said air bearing surface, and wherein said thermal shunt has a lateral width approximate to said particular lateral width of said return pole pedestal.

9. A hard disk drive, comprising:
   a heat-assisted magnetic recording (HAMR) head slider comprising:
      a magnetic write pole extending to an air bearing surface,
      a magnetic return pole, magnetically connected with said write pole in a region removed from said air bearing surface,
      an E-antenna near field transducer (NFT) configured to receive optical energy and to emit at least a portion of said optical energy to a magnetic-recording medium, said NFT comprising an E-antenna having a tip, an aperture, and a magnetic write pole lip, and
      a thermal shunt positioned between said NFT and said return pole and configured to draw heat from said NFT, said thermal shunt comprising a first portion and a second portion separated from said first portion such that the electrical field between said write pole lip and said tip is stronger than would otherwise be if said thermal shunt comprised a single continuous piece;
   a magnetic-recording disk rotatably mounted on a spindle;
   a voice coil motor configured to move said head slider to access portions of said magnetic-recording disk.

10. The hard disk drive of claim 9, wherein said first portion comprises an NFT-side and a return pole-side and said second portion comprises an NFT-side and a return pole-side, and wherein the distance between said NFT-sides is greater than the distance between said return-pole sides.

11. The hard disk drive of claim 9, wherein said thermal shunt comprises a first portion and a second portion separated from said first portion by a trapezoidal cross-section shaped gap.

12. The hard disk drive of claim 9, wherein said thermal shunt comprises a first portion and a second portion separated from said first portion by a dielectric gap.

13. The hard disk drive of claim 9, wherein said write pole lip and said E-antenna form an LC resonator.

14. The hard disk drive of claim 9, wherein said optical energy received at said E-antenna NFT has a transverse magnetic mode of electromagnetic radiation.

15. The hard disk drive of claim 9, wherein said E-antenna NFT has a particular lateral width at said air bearing surface, and wherein said thermal shunt has a lateral width approximate to said particular lateral width of said E-antenna NFT.

16. The hard disk drive of claim 9, wherein said return pole comprises a pedestal having a particular lateral width at said air bearing surface, and wherein said thermal shunt has a lateral width approximate to said particular lateral width of said return pole pedestal.

17. A heat-assisted magnetic recording (HAMR) head slider comprising:
   a magnetic write pole extending to an air bearing surface and having a write pole lip;
   a magnetic return pole, magnetically connected with said write pole in a region removed from said air bearing surface and having a return pole pedestal at said air bearing surface;
   a near field transducer (NFT) configured to receive optical energy and to emit at least a portion of said optical energy to a magnetic-recording medium, said NFT comprising an E-antenna having a tip, a lateral heat sink on each side of said E-antenna, an aperture, and said write pole lip; and
   a thermal shunt positioned between said NFT and said return pole pedestal and configured to draw heat from a region around said NFT, said thermal shunt comprising a first portion and a second portion separated from said first portion by a trapezoidal cross-section shaped gap such that the electrical field between said write pole lip and said tip is stronger than would otherwise be if said thermal shunt comprised a single continuous piece.

18. The HAMR head slider of claim 17, wherein said NFT has a particular lateral width at said air bearing surface, and wherein said thermal shunt has a lateral width approximate to said particular lateral width of said NFT.

* * * * *